(12) United States Patent
Schneider et al.

(10) Patent No.: US 7,150,767 B1
(45) Date of Patent: Dec. 19, 2006

(54) METHOD FOR PRODUCING AN ELECTRODE FOR A CAPACITOR FROM FOIL

(75) Inventors: Clinton W. Schneider, Plymouth, MN (US); R. Jason Hemphill, Pickens, SC (US); Katherine E. Sudduth, Easley, SC (US); Thomas V. Graham, Boulder, CO (US); Thomas F. Strange, Easley, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 479 days.

(21) Appl. No.: 10/701,233

(22) Filed: Nov. 3, 2003

(51) Int. Cl.
*H01G 9/00* (2006.01)

(52) U.S. Cl. .................. 29/25.03; 29/25.42; 29/620; 361/523

(58) Field of Classification Search .... 29/25.01–25.03, 29/825, 846; 361/508–512, 528; 427/80; 438/379, 171; 359/9, 23, 900
See application file for complete search history.

(56) References Cited

U.S. PATENT DOCUMENTS

| | | | |
|---|---|---|---|
| 3,779,877 A | 12/1973 | Alwitt | 204/129.75 |
| 4,213,835 A | 7/1980 | Fickelscher | 204/129.25 |
| 4,420,367 A | 12/1983 | Locher | 156/651 |
| 4,474,657 A | 10/1984 | Arora | 204/129.75 |
| 4,518,471 A | 5/1985 | Arora | 204/129.1 |
| 4,525,249 A | 6/1985 | Arora | 204/129.75 |
| 5,343,292 A * | 8/1994 | Brueck et al. | 356/509 |
| 5,503,718 A | 4/1996 | Kakizakai | 216/6 |
| 5,660,737 A * | 8/1997 | Elias et al. | 216/6 |
| 5,715,133 A | 2/1998 | Harrington et al. | 361/500 |
| 6,088,505 A | 7/2000 | Hobbs | 385/147 |
| 6,409,776 B1 * | 6/2002 | Yan et al. | 29/25.03 |
| 6,882,452 B1 * | 4/2005 | Decker et al. | 359/2 |
| 7,025,795 B1 * | 4/2006 | Monden et al. | 29/25.03 |

FOREIGN PATENT DOCUMENTS

| WO | WO 97/48021 | 12/1997 |
|---|---|---|
| WO | WO 99/59035 | 11/1999 |

* cited by examiner

*Primary Examiner*—Minh Trinh
(74) *Attorney, Agent, or Firm*—Steven M. Mitchell

(57) ABSTRACT

A method of producing an electrode for use in the manufacture of electrolytic capacitors for implantable cardioverter defibrillators comprises first coating the foil with a photoresist, second, applying a holographic image to the photoresist, third, removing a portion of the photoresist to expose a portion of the foil and create a pattern of photoresist on the foil and etching the foil. Alternatively, the method comprises applying an oxide or metal layer to the exposed foil surface, removing the pattern of photoresist to create a pattern of oxide or metal and etching the foil. The patterns of photoresist, oxide or metal all retard or prevent etching of the foil where the foil surface is covered. This results in a pattern of unetched foil with the remaining area being heavily etched. The resulting patterns stop crack propagation through the etched portions to yield foils with high gain and improved strength.

14 Claims, 9 Drawing Sheets

METHOD FOR PRODUCING AN ELECTRODE FOR A CAPACITOR FROM FOIL

BACKGROUND OF THE INVENTION

1. Field of the Invention

Figure 1A:
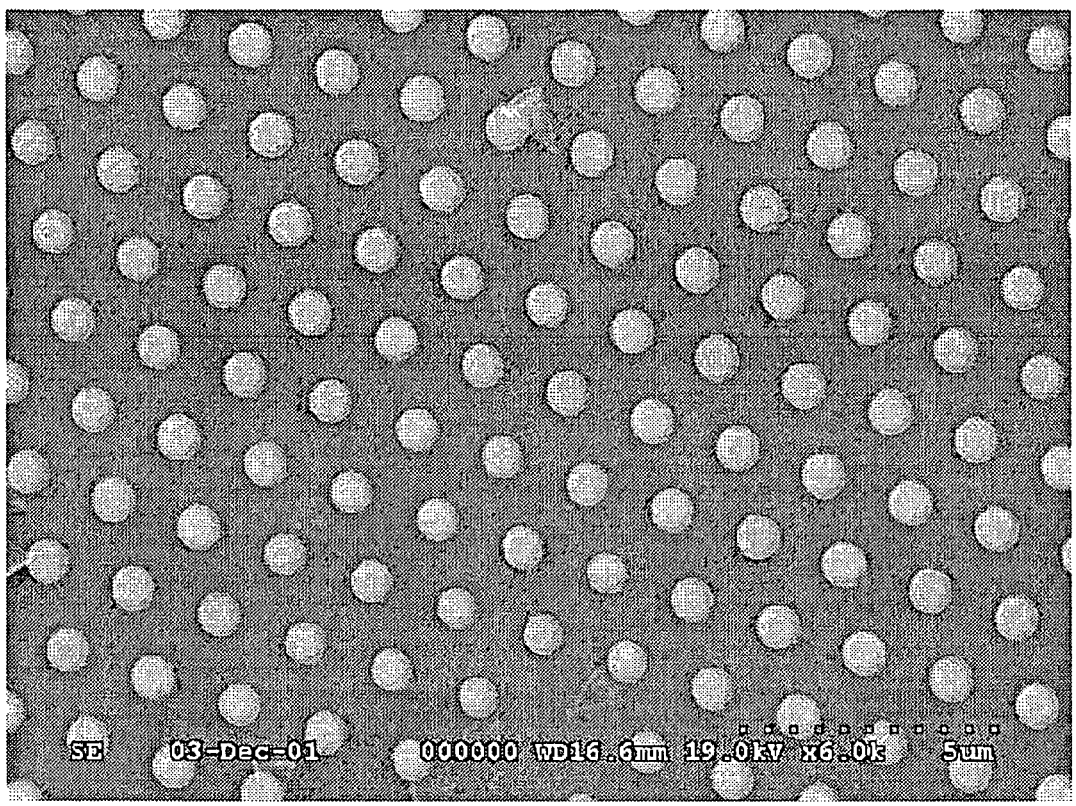

The present invention is directed to a method of producing high gain porous electrodes for use in the manufacture of electrolytic capacitors, more particularly to a method of creating porous anode foil for use in multiple anode stack configuration electrolytic capacitors of the type used in implantable cardioverter defibrillators (ICDs).

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an implantable cardioverter defibrillator (ICD), also referred to as an implantable defibrillator, since the high voltage capacitors used to deliver the defibrillation pulse can occupy as much as one third of the ICD volume.

Electrolytic capacitors are used in ICDs because they have the most nearly ideal properties in terms of size and ability to withstand relatively high voltage. Conventionally, an electrolytic capacitor includes an etched aluminum foil anode, an aluminum foil or film cathode, and an interposed kraft paper or fabric gauze separator impregnated with a solvent-based liquid electrolyte. The electrolyte impregnated in the separator functions as the cathode in continuity with the cathode foil, while an oxide layer on the anode foil functions as the dielectric. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, composing a planar, layered, stack structure of electrode materials with separators interposed therebetween.

Since these capacitors must typically store approximately 30–40 joules, their size can be relatively large, and it is difficult to package them in a small implantable device. Currently available ICDs are relatively large (over 44 cubic centimeters (cc)), generally rectangular devices about 12–16 millimeters (mm) thick. A patient who has a device implanted may often be bothered by the presence of the large object in his or her pectoral region. Furthermore, the generally rectangular shape can in some instances lead to pocket erosion at the somewhat curved corners of the device. For the comfort of the patient, it is desirable to make smaller and more rounded ICDs. The size and configuration of the capacitors has been a major stumbling block in achieving this goal.

In ICDs, as in other applications where space is a critical design element, it is desirable to use capacitors with the greatest possible capacitance per unit volume. Since the capacitance of an electrolytic capacitor increases with the surface area of its electrodes, increasing the surface area of the aluminum anode foil results in increased capacitance per unit volume of the electrolytic capacitor. By electrolytically etching aluminum foils, an enlargement of a surface area of the foil will occur. As a result of this enlargement of the surface area, electrolytic capacitors, which are manufactured with the etched foils, can obtain a given capacity with a smaller volume than an electrolytic capacitor which utilizes a foil with an unetched surface.

In a conventional electrolytic etching process, surface area of the foil is increased by removing portions of the aluminum foil to create etch tunnels. The foil used for such etching is typically an etchable aluminum strip of high cubicity. High cubicity in the present context is where at least 85% of crystalline aluminum structure is oriented in a normal position (i.e., a (1,0,0) orientation) relative to the surface of the foil. Such foils are well-known in the art and are readily available from commercial sources. While electrolytic capacitors having anodes and cathodes comprised of aluminum foil are most common, anode and cathode foils of other conventional valve metals such as titanium, tantalum, magnesium, niobium, zirconium and zinc are also used.

U.S. Pat. No. 4,213,835 to Fickelscher discloses a method for electrolytically etching a recrystallized aluminum foil which allows manufacture of foils with exclusively pure cylindrical or cubical etching structures and tunnel densities greater than $10^7/cm^2$ with an avoidance of irregular pitting of the foil. The method consists of providing an etching bath containing chloride ions, positioning the foil in the bath and potentiostatically etching the foil with a temporally constant anode potential. The preferred etching step occurs in two stages. In the first stage, the etching current density is set above the potential or current density which creates pitting of the aluminum. After an induction period of around 10 seconds, the etching tunnels grow autocatalytically at a rate of several μm/s with a pore diameter of approximately 0.2 μm in the crystal oriented direction (i.e., a (1,0,0) orientation relative to the surface of the foil). After approximately one minute of exclusive tunnel formation and in order to avoid the occurrence of coarse pitting, the etching current density is reduced. In the second stage, the current density is set below the current density which creates pitting of the aluminum, such that only pore or tunnel enlargement up to the desired value will occur. Thus, the etching time for the tunnel enlargement is relatively long in relation to the etching time for obtaining the tunnel structure in the foil.

U.S. Pat. No. 4,420,367 to Löcher discloses a similar method for etching aluminum foil for electrolytic capacitors. Electrolytic tunnel formation is carried out in a first etching stage, as described above. However, the further etching for tunnel enlargement is non-electrolytic, taking place chemically in one or several etching stages. The method is preferably carried out in a halogen-free or chloride-free solution having nitrate ions, such as $HNO_3$ and/or $Al(NO_3)_3$.

U.S. Pat. Nos. 4,474,657, 4,518,471 and 4,525,249 to Arora disclose the etching of aluminum electrolytic capacitor foil by passing the foil through an electrolyte bath. The preferred bath contains 3% hydrochloric acid and 1% aluminum as aluminum chloride. The etching is carried out under a direct current (DC) and at a temperature of 75° C. U.S. Pat. No. 4,518,471 adds a second step where the etched foil is treated in a similar bath with a lower current density and at a temperature of 80–82.5° C. U.S. Pat. No. 4,525,249 adds a different second step, where the etched foil is treated in a bath of 8% nitric acid and 2.6% aluminum as a nitrate, at a temperature of 85° C.

The ideal etching structure is a pure tunnel-like etching with defined and uniform tunnel diameters and without any undesirable pitting of the foil. As tunnel density (i.e., the number of tunnels per square centimeter) is increased, a corresponding enlargement of the overall surface area will occur. Larger surface area results in higher overall capacitance. However, high gain etching of valve metals for use as anodes in electrolytic capacitors tend to produce very brittle anode foil. Typically the higher the gain of the anode foil, the more brittle the foil. In particular, the brittleness of the foil and its capacitance are both proportional to the depth of the etching and the density of the etch pits, i.e., the number per unit area. Accordingly, the capacitance and thereby the energy density are limited by the brittleness of the formed foil. As the brittleness of the formed foil increases, cracks formed in the foil more easily propagate across the foil, resulting in broken anodes. Therefore, there is a need for an improved method for etching anode foil which reduces the propagation of cracks that lead to broken anodes.

SUMMARY OF THE INVENTION

The present invention is directed to a method of creating porous electrode foil for use in multiple anode stack configuration electrolytic capacitors, in order to reduce the equivalent series resistance (ESR) of such multiple electrode stack configurations without sacrificing capacitance. An electrolytic capacitor incorporating the etched anode foil of the present invention can be used in an implantable cardioverter defibrillator (ICD).

A first embodiment of the present invention is directed to a method of producing an electrode for a capacitor from a foil. The method comprises, first, coating the foil with a photoresist; second, applying a holographic image to the photoresist; third, removing a portion of the photoresist, to expose a portion of the foil and create a pattern of photoresist on the foil and fourth, etching the foil. Optionally, the foil is further processed in widening and forming steps.

In a second embodiment of the invention, the method comprises applying a layer of inert oxide or metal on the exposed foil surface after the step of removing the photoresist. The remaining photoresist is removed to expose a portion of the foil and create a pattern of oxide or metal on the foil, and the foil is then etched.

Any photoresist can be used in the invention that is light sensitive, can be patterned using light and reduces etching of the foil when covering the surface. The photoresist is coated using standard methods known to those in the art, including spin coating and blade coating. The coating step can be done with the photoresist dissolved in an appropriate solvent or with the photoresist in the melt. The oxide layer can be any oxide of the foil, preferably aluminum oxide. The aluminum oxide layer acts as a mask to reduce or prevent etching. Likewise, the metal layer is any metal that prevents etching of the underlying foil, for example, platinum or gold. The oxide layer can be applied by any method known to those in the art that applies a layer of controlled thickness on the foil surface, preferably by an electrochemical process.

The holographic image is applied to the photoresist coating to develop the photoresist. Holographic images are applied photolithographically, using a system such as that provided by Optical Switch Corporation, Richardson, Tex., detailed in U.S. Pat. No. 6,088,505 and International Patent Application Nos. WO 97/48021 and WO 99/59035, incorporated herein by reference.

A portion of the photoresist, and optionally the photoresist and an anti-reflective coating (ARC), is removed after the holographic image is applied. The photoresist and ARC are removed by any method known to those in the art, and include solvent washing with aqueous acids and bases, organic solvents or by ion-etching.

The foils are etched using any method that increases the surface area of the foil, preferably electrochemically. The foils are etched in an electrochemical bath comprising an anode portion and a cathode portion. The foils are placed in the anode portion, which further comprises an anode electrolyte. The anode electrolyte promotes electrochemical etching and comprises an aqueous solution of an oxidizer or alternatively, an oxidizer and an acid. A charge source is connected to the anode portion and the cathode portion. The cathode portion is any inert metal, for example titanium, gold or platinum. A current is caused to flow between the anode and cathode portions and the charge flow is monitored on the anode. The etching is complete when the charge on the anode reaches a predetermined level. The pattern of photoresist, or alternatively the pattern of oxide or metal, on the foil reduces or prevents etching of the foil on the covered areas. The exposed portion of the foil, therefore, etches more heavily.

The foil is further processed in a widening step and a finishing step. The anode foil is suitable for use in an electrolytic capacitor with a multiple anode stack or wound roll configuration, after forming a barrier oxide sufficiently thick to support the intended use voltage. The electrochemical etching step of the present invention produces a pore structure in the anode foil which is microscopic in pore diameter and spacing. The combination of etched and unetched areas on the foil maintains high gain and high strength. The high strength and ductility of the foil is maintained by the patterned unetched (or less etched) areas which stop the propagation of any cracks that may form in the heavily etched areas.

BRIEF DESCRIPTION OF THE DRAWINGS/FIGURES

Figure 1B:
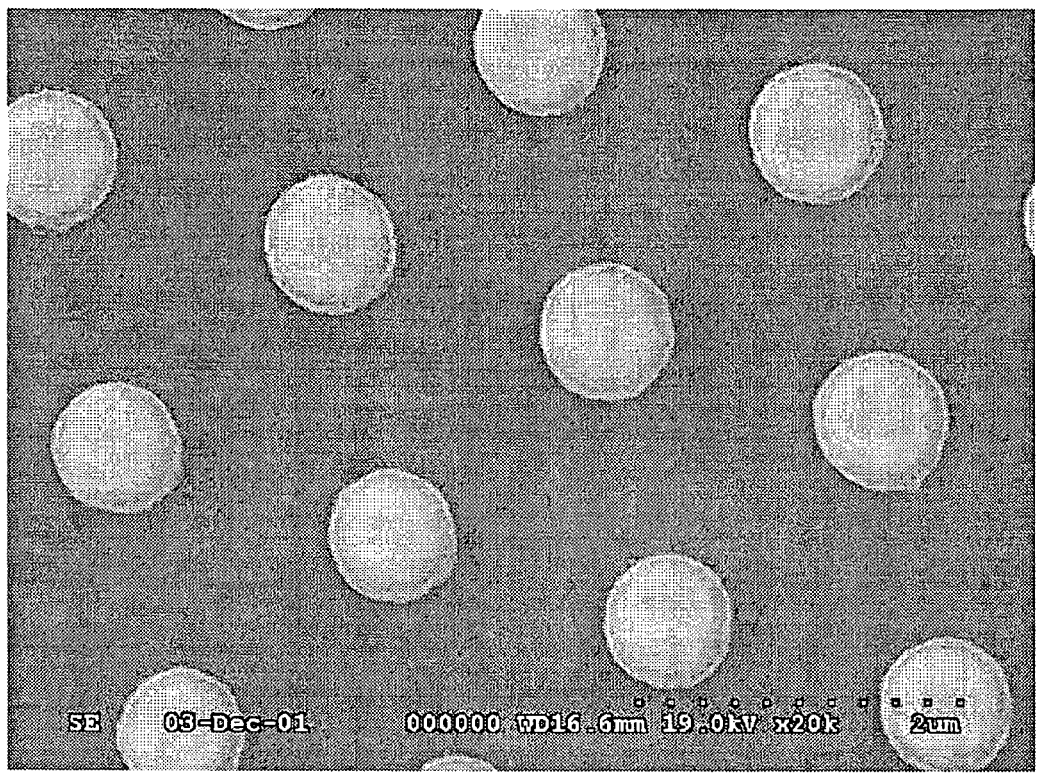

FIGS. 1A–B are Scanning Electron Microscope (SEM) images of a foil surface that has been chemically polished. The surface is covered with regularly spaced posts of photoresist after hard baking. The posts were produced using a negative photoresist.

Figure 2A:
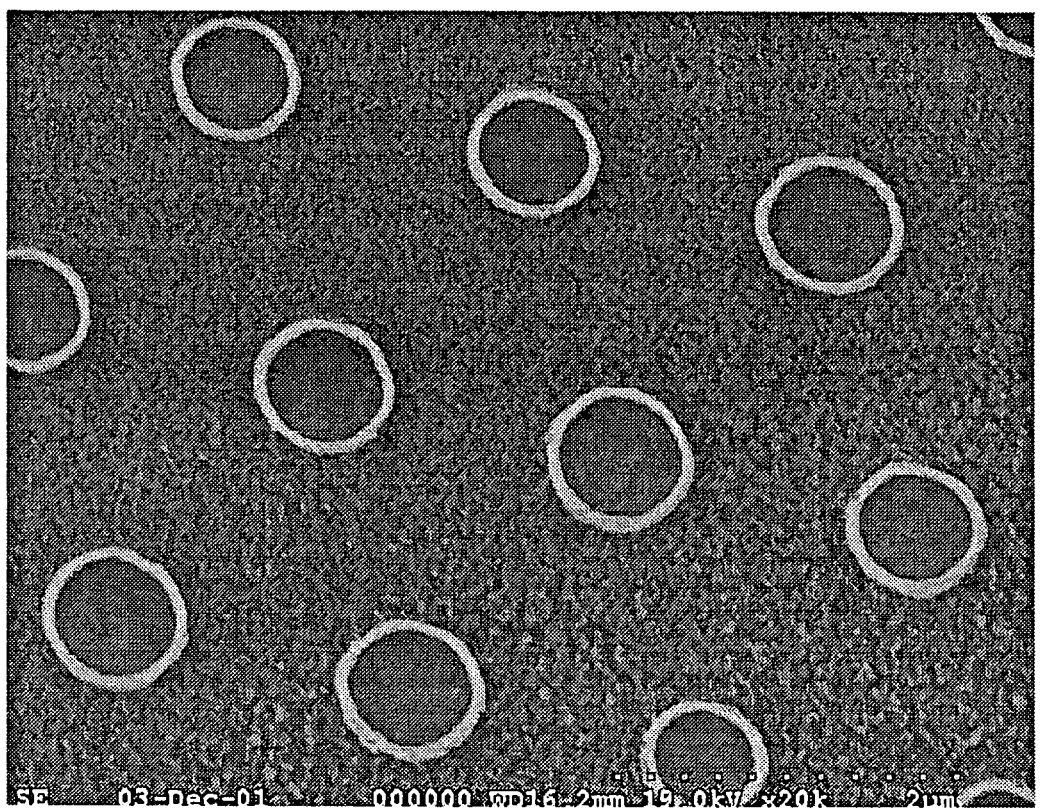
Figure 2B:
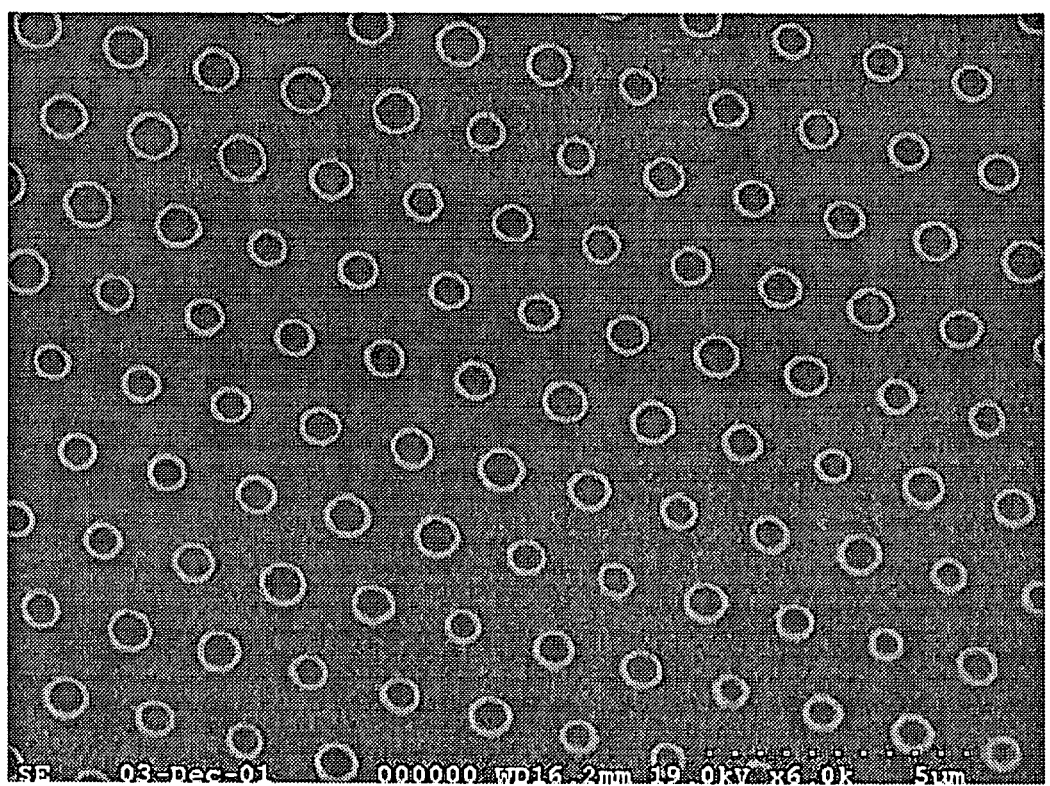

FIGS. 2A–B are SEM images of a foil surface that has been electrochemically polished. The surface is covered with regularly spaced posts of photoresist after hard baking. The posts were produced using a negative photoresist.

Figure 3A:
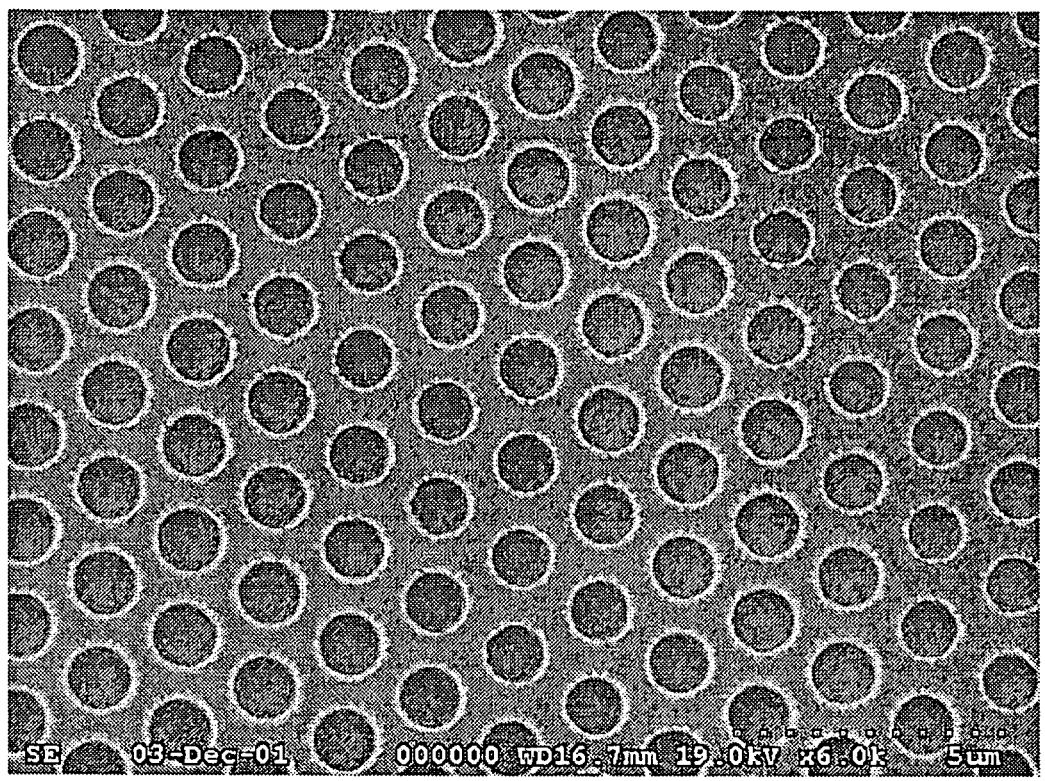
Figure 3B:
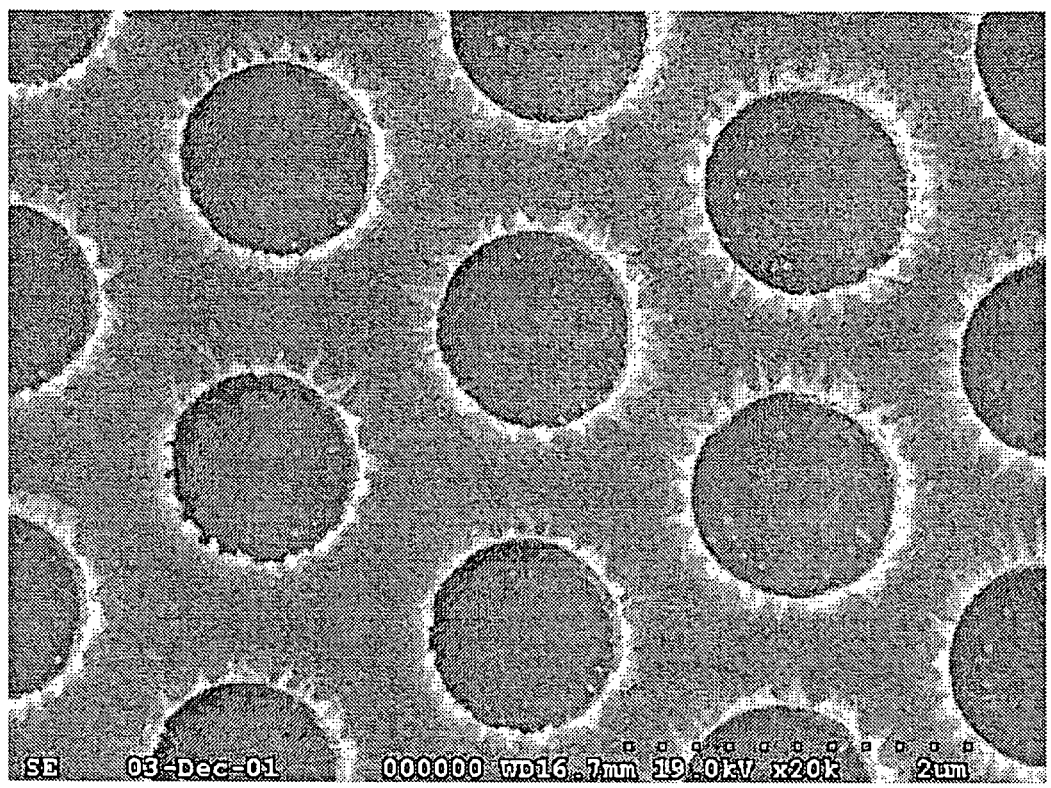

FIGS. 3A–B are SEM images of a foil surface that has been chemically polished. The surface is covered with a photoresist layer containing regularly spaced openings produced using a positive photoresist.

Figure 4A:
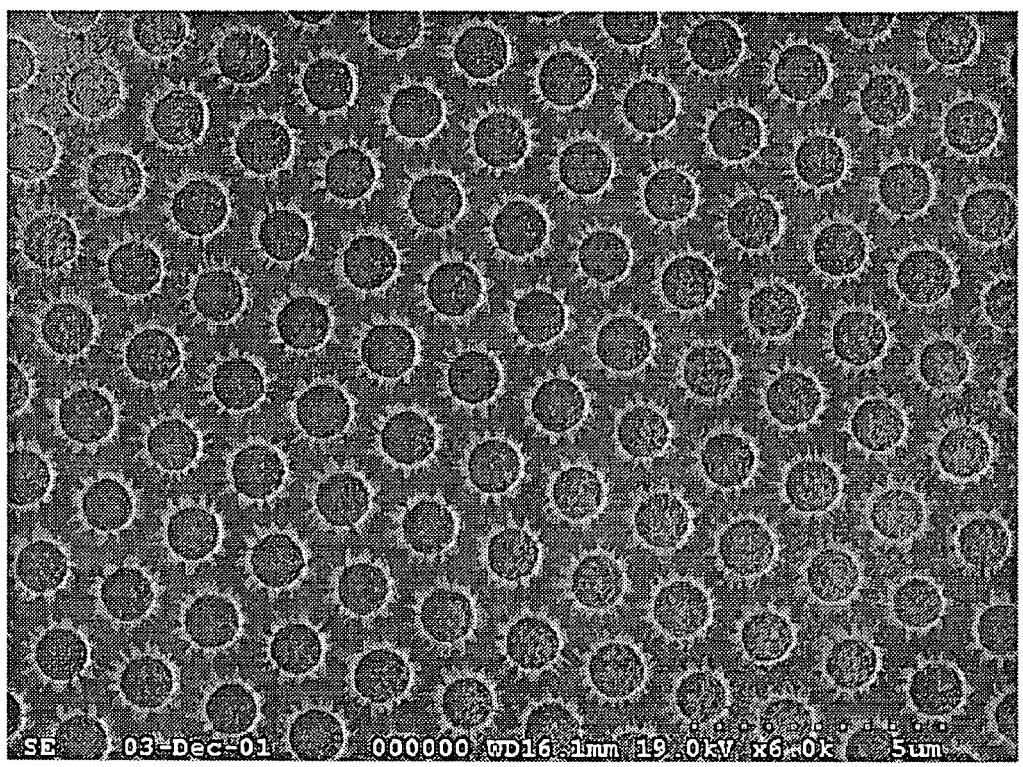
Figure 4B:
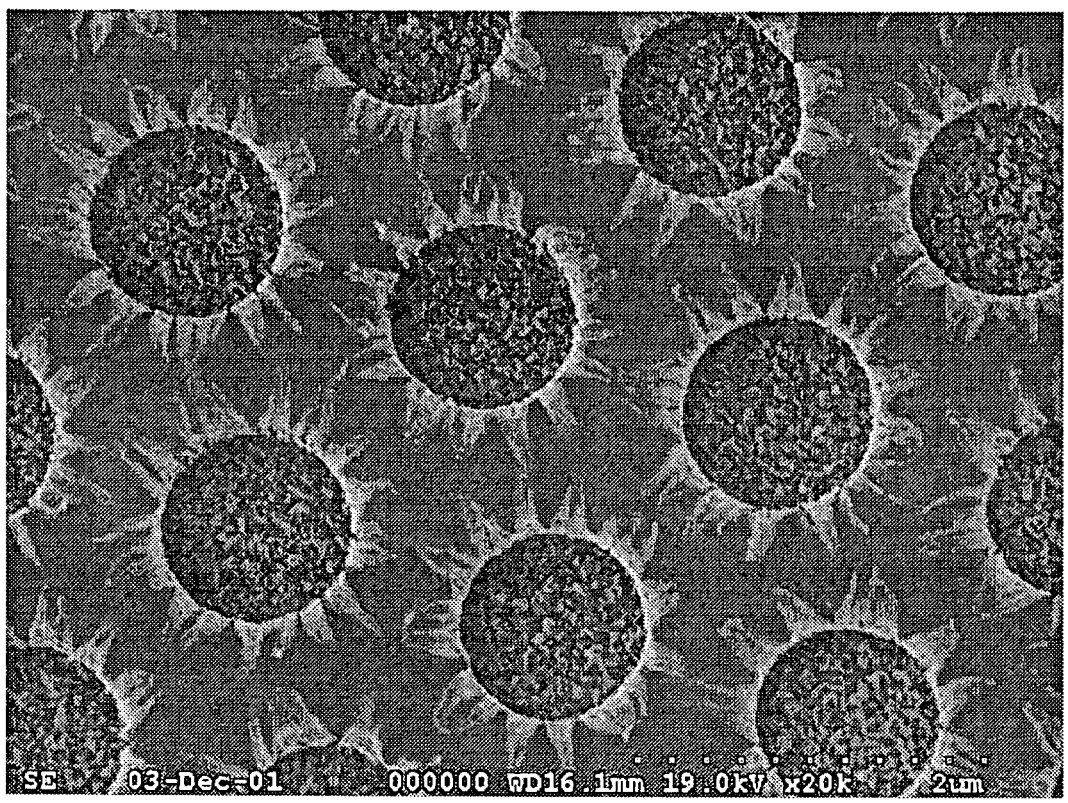

FIGS. 4A–B are SEM images of a foil surface that has been electrochemically polished. The surface is covered with a photoresist layer containing regularly spaced openings produced using a positive photoresist.

Figure 5:
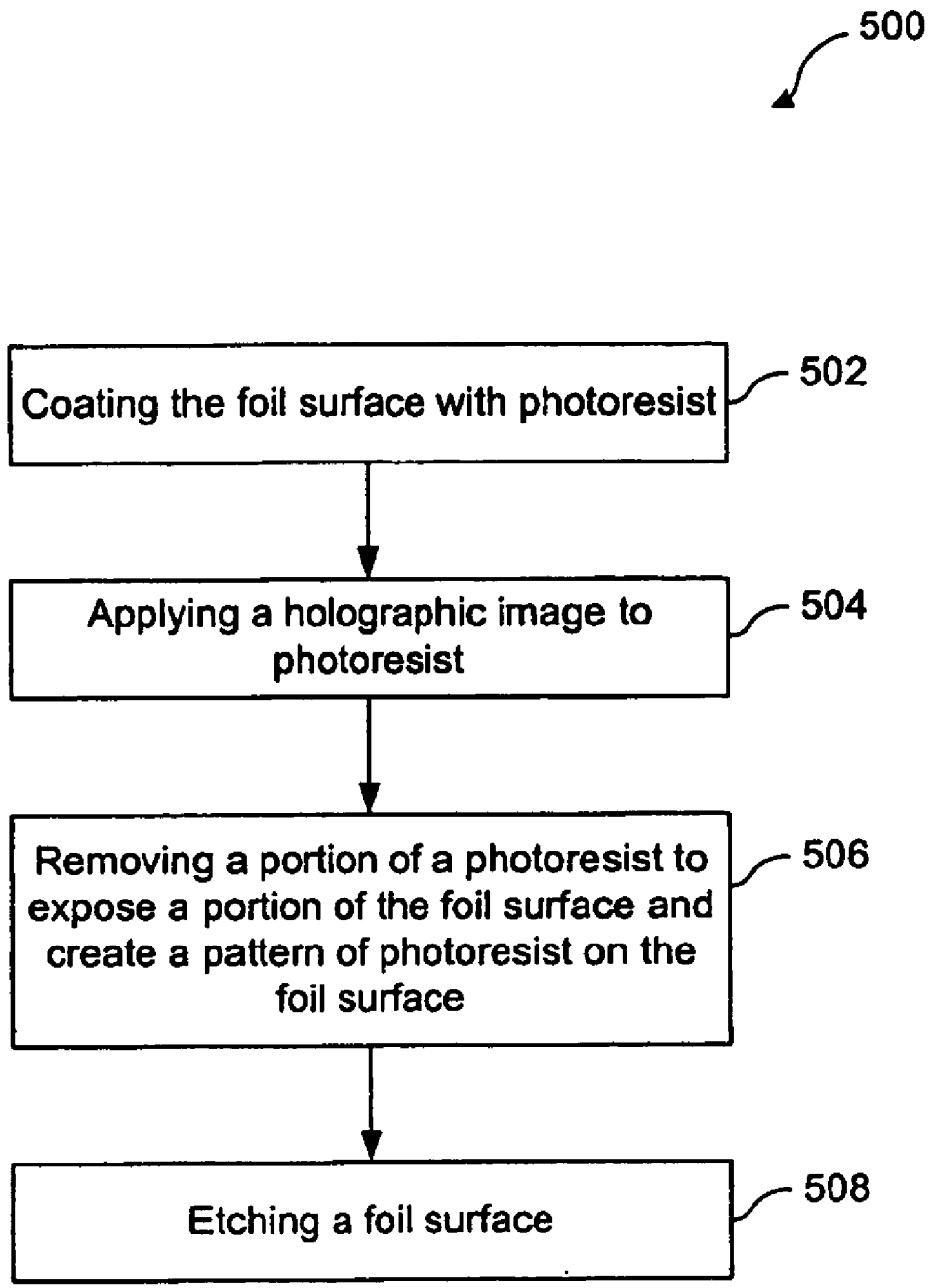

FIG. 5 is a flow chart describing a method of producing a foil according to an embodiment of the present invention.

DETAILED DESCRIPTION OF THE INVENTION

A first embodiment of the invention, as depicted in FIG. 5, is directed to a method 500 of producing an electrode for a capacitor from a foil. The method comprises coating the foil surface with a photoresist 502, applying a holographic image to the photoresist 504 and developing the photoresist in the image, removing a portion of the photoresist to expose a portion of the foil and create a pattern of photoresist on the foil 506, and etching the foil 508. The foil is optionally further processed in widening and forming steps.

In a second embodiment, after the step of removing the photoresist, an oxide or metallic layer is deposited on the exposed foil portion. The remaining photoresist is then removed to expose a portion of the foil and create a pattern of inert oxide or metal. The foil is then etched. The foil is optionally further processed in widening and forming steps.

In the present invention, the foil is used as an anode in a capacitor, or alternatively, as a cathode. The foil is made of any electrically conductive material, for example a metal such as aluminum, a metal alloy, or a metal composite. Alternative metals include but are not limited to zinc, zirconium, titanium, tantalum, magnesium, niobium, and alloys of any or all these metals.

Before coating the surface of the foil with a photoresist, the foils may be polished to reduce the roughness of the foil surface. A foil is polished by any means that reduces the surface roughness, for example, mechanical rubbing. Alternative means of polishing the foils include, but are not limited to re-rolling, chemical or electrochemical polishing and chemical mechanical polishing. Smooth foil surfaces improve the adhesion of the photoresist.

After polishing the foil surface, the foil is coated with a photoresist, or alternatively, first with an antireflective coating (ARC) and then with a photoresist. Coating the polished foils first with an ARC is preferred. The ARC layer improves photoresist development when the holographic image is applied. Antireflective coatings for use in the present invention include any material that minimizes the reflection of light, for example dielectrics such as silicon dioxide or organic materials such as siloxane polymers. Alternative materials include but are not limited to silicone monoxide and ditantalum pentoxide. Commercial ARCs for use in the present invention include, but are not limited to, AR3™, AR10™ and AR20™ (available from Shipley Company, L.L.C., Marlborough, Mass.).

The foil is coated with photoresist or ARC by a method that deposits a smooth and uniform layer with predetermined thickness, for example, spin coating. In spin coating, the ARC or photoresist is dissolved in an appropriate solvent, for example, an organic solvent such as n-butyl acetate, n-hexyl acetate, 2-butanol, toluene, xylenes, trichloroethylene or trimethylpentane. A preferred method of coating the foil is blade coating or doctor blade coating. The photoresist or ARC can be coated as a melt or as a solution, preferably as a melt. This method quickly gives high quality, thin or thick films over large areas of foil surface. The desired film thickness is in the range from about 100 nm to about 1000 μm, preferably from about 50 μm to 500 μm.

The photoresist is any material that is photosensitive and can be used to create a mask for use in photolithography. Photoresist materials used include positive or negative photoresists. Exposing a positive photoresist to light makes it easier to remove in a washing step. Exposing a negative photoresist to light makes it more difficult to remove in the washing step. If the washing step comprises washing the foil with an organic solvent, then a positive photoresist becomes more soluble upon exposure and a negative photoresist becomes less soluble upon exposure to light. Examples of photoresist materials include but are not limited to organic polymers such as derivatives of polymethylmethacrylate, polyisoprene, cyclized poly-cis-isoprene, polybutenesulfone, phenol-formaldehyde resins such as novalac, fluoropolymers such as tetrafluoroethlyene, and copolymers of isoprene, tetrafluoroethylene, styrene and norbornene. The photoresists may be compounded with photoreactive cross-linking agents, for example, bisazides such as 2,6-bis(4-azidobenzal)-4-methylcyclohexanone, or with other photoreactive compounds, for example, diazo compounds such as diazonaphthquinone. Commercial photoresists for use in the present invention include, but are not limited to, DUV UV™, MICROPOSIT™, and S1800™ type photoresists (available from Shipley Company L.L.C., Marlborough, Mass.); AZ 1350J-SF photoresists (available from Hoechst-Celanese Company, Somerville, N.J.); and RISTON™ photoresists (available from DuPont Chemicals, Towanda, Pa.).

Foils coated with photoresists are heated in an oven to soft-bake the photoresists before applying the holographic image. Soft bake is used here to mean heating the photoresist to a temperature that improves the photoresist adhesion, photosensitivity, and mechanical strength and, if present, removing any trace solvent. Soft bake temperatures are in the range of about 70° C. to about 100° C., preferably about 85–95° C. Foils coated with photoresist are heated from about five minutes to about one hour, preferably about 20 to 30 minutes.

Applying a holographic image to the foil coated with photoresist develops the photoresist. Holographic images are applied photolithographically, using a system provided by Optical Switch Corporation, Richardson, Tex., detailed in U.S. Pat. No. 6,088,505 and International Patent Application Nos. WO 97/48021 and WO 99/59035.

Photoresist is removed after applying the holographic image to the foil in a washing step. Washing the foil in a solution removes unwanted photoresist and ARC. Alternatively, the unwanted photoresist and ARC are removed by a solution washing step and an ion-etching step, or by only an ion-etch step. Solutions used in the washing step include aqueous mineral acids such as nitric, sulfuric and hydrochloric acid; organic solvents such as methyl ethyl ketone, acetone, methyl tert-butyl ether, toluene, xylene, trichloroethylene; alcohols such as 2-propanol, butanol, 2-butanol; and aqueous solutions of sodium hydroxide, potassium hydroxide and ammonium hydroxide. Commercial washing solutions for use in the present invention include, but are not limited to, PRX-120™, PRX-179™ and PRX-417™ (available from Shipley Company L.L.C., Marlborough, Mass.) and NO-MICROETCH™ cleaning solutions (available from RD Chemical Company, Mountain View, Calif.). Ion-etching is done with ions that are capable of removing the photoresist and ARC, which include but are not limited to reactive ions of argon, carbon tetrachloride, carbon tetrafluoride, dichlorodifluroromethane, trifluoromethane, hexafluoroethane, oxygen, hydrogen and sulfur hexafluoride. Removing the unwanted photoresist and ARC in the washing step produces the desired patterned photoresist mask and exposes a portion of the foil surface.

The photoresist pattern is any regular two or three-dimensional pattern of photoresist, for example, a regular array of circular openings in the photoresist film that expose the foil surface. FIGS. 3A–B and 4A–B illustrate a regular array of circular openings in a photoresist. A positive photoresist was used to produce the patterned array. Alternative regular patterns of photoresist include regularly spaced substantially rectangular or sinusoidal grooves and regularly spaced posts. The posts are any predetermined shape, for example, cylindrical. FIGS. 1A–1B and 2A–B illustrate a regular array of cylindrical posts on a foil surface. The posts were produced using a negative photoresist. Alternatively, the posts are rectangular or cubical. A preferred shape for the posts is one that produces the motheye pattern on the foil surface. The motheye pattern is described in U.S. Pat. No. 6,088,505, which is incorporated herein by reference. Alternatively, the photoresist pattern is any irregular or random pattern.

After the washing step, the pattern of photoresist on the foil surface is heated in an oven to hard bake the photoresist. Hardbaking the photoresist improves its durability and adhesion. Hard baking temperatures are in the range of about 90°

C. to about 150° C., preferably about 120° C. Foils are hard baked for about 10 to about 100 minutes, preferably 20–30 minutes. The foils with patterned photoresist are then etched, or alternatively, further processed according to the second embodiment.

In the second embodiment of the invention, an oxide or metallic layer is deposited on the foil surface after the hard-bake step. The oxide or metallic layer is inert so that the area covered by the oxide or metallic layer is not etched in an etching step. The layer of oxide or metal is deposited by any method that results in a controlled thickness of oxide or metal on the foil surface, preferably by electrochemical deposition. The inert material is deposited to a thickness that will prevent etching, preferably about 20–100 μm. The oxide layer is any oxide that prevents etching, preferably aluminum oxide. The inert metallic layer is any metal that prevents etching of the foil, for example gold or platinum. After the inert layer is deposited on the foil surface, the remaining photoresist, or alternatively, the remaining photoresist and ARC, is removed in a washing step. The washing step includes a solution wash, and optionally, an ion-etching step, or only an ion-etch step. The washing step creates an area of exposed foil around a mask of inert oxide or metal. The exposed foil is then etched.

Etching the foil increases the surface area of the foil. The foil is etched according to any method that increases the surface area, preferably electrochemical etching. Other methods include roughing the foil surface mechanically and chemical etching. Electrochemical etching increases the surface area of the foil by electrochemically removing portions of the foil to creates etch tunnels. Electrochemical etching is done according to any known etch process, such as the ones discussed in U.S. Pat. Nos. 4,474,657; 4,518,471; 4,525,249 and 5,715,133, which are incorporated herein by reference.

The foil coated with patterned photoresist, or optionally, coated with patterned inert oxide or metal, is etched in an electrolyte fluid that promotes electrochemical etching. The electrolyte comprises a halide and/or oxyhalide, preferably a chloride and/or oxychloride, and an oxidizer such as hydrogen peroxide, sodium perchlorate, sodium persulfate, cerium sulfate or sodium periodate. The pH of the electrolyte is maintained in the range of about 0.0 to about 8.0, preferably a pH of about 1.0 to about 3.0. An acid is added to the electrolyte to maintain the pH, for example hydrochloric acid. Alternative acids for use in the present invention include but are not limited to sulfuric, nitric, hydrobromic, and hydrofluoric acids; or organic acids such as formic, acetic, citric and para-toluenesulfonic acid. Other surface area enhancing etch solutions can be used with the present invention to produce similar results. Preferably, the electrolyte etch solution comprises about 1.3% by weight NaCl and about 3.5% by weight $NaClO_4$. The electrolyte is heated to a temperature of about 80° C. to about 100° C., with a preferred temperature of about 85° C. The foil is placed in the etch electrolyte and etched at a current density of about 0.1 to about 0.3 Amps/$cm^2$, preferably about 0.15 Amps/$cm^2$. The current density corresponds to an etch charge of about 5 to about 50 Coulombs/$cm^2$ for a specific amount of time, preferably about 36 Coulombs/$cm^2$ for about 4 minutes. The foil is etched to produce an enlargement of surface area of at least about 20 times.

Upon etching, the areas of foil covered with patterned photoresist, or optionally, inert oxide or metal, etch more slowly or not at all. The optional oxide layer acts as a mask between the foil surface and the etch electrolyte to retard or prevent etching. The patterned areas, in which little or no etching occurs, increase the overall mechanical strength of the foil by stopping or retarding the propagation of cracks through the heavily etched portions. This pre-etch photoresist or inert layer patterning increases the foil strength and ductility while allowing for relatively heavy foil etching in select areas, which yields high gain, high strength electrodes for ICD capacitors.

The foil is optionally further processed in a widening step. Foils are widened in a chloride or nitrate containing electrolyte solution known to those skilled in the art, such as that disclosed in U.S. Pat. Nos. 3,779,877 and 4,525,249, which are incorporated herein by reference. The foil is then dipped into a deionized water bath at a temperature of 80° C. to 100° C., preferably 95° C., to form a hydrate on the foil surface.

Next, the foils are optionally further processed in a forming solution. A barrier oxide layer is electrochemically formed onto one or both surfaces of the metal foil, sufficiently thick to support the intended use voltage. The foil is placed into a forming solution, including but not restricted to a solution based on azelaic acid, sebacic acid, suberic acid, adipic acid, dodecanedioic acid, citric acid or other related organic acids and salts. Preferably a citric acid is used solution at a temperature of about 80° C. to 100° C., preferably 85° C., at a current density of about 1 mA/$cm^2$ to 40 mA/$cm^2$, preferably 16 mA/$cm^2$. A formation voltage of about 50 to 800 Volts, preferably 445 V, can be applied to the foil to form the barrier oxide layer. The barrier oxide layer provides a high resistance to current passing between the electrolyte and the metal foils, also referred to as the leakage current. A high leakage current can result in poor performance and reliability of an electrolytic capacitor. In particular, a high leakage current results in a greater amount of charge leaking out of the capacitor once it has been charged.

A heat treatment of about 500° C.±20° C. may be applied to the foil following formation for about 1 to about 10 minutes, preferably about 4 minutes. The foil is then returned to the forming solution and allowed to soak with no applied potential for about 1 to about 10 minutes, preferably about 2 minutes. A second formation in the same electrolytic forming solution at high temperature is performed at a potential of about 435 Volts.

Next, the foils are dipped in a suitable low concentration oxide-dissolving acid solution including but not restricted to phosphoric acid, formic acid, acetic acid, citric acid, oxalic acid, and acids of the halides. Preferably phosphoric acid is used at a concentration of about 1% to 10%, preferably a concentration of about 2%, at a temperature of about 60° C. to 90° C., preferably about 70° C., for an time of about one to about ten minutes, preferably about four minutes.

Finally, the foils are reformed at a voltage of about 435 Volts in a suitable forming solution, as discussed above, at a high temperature, preferably about 80° C. to about 100° C., more preferably about 85° C.

Electrolytic capacitors manufactured with anode foils etched according to the present invention may be utilized in ICDs, such as those described in U.S. Pat. No. 5,522,851 to Fayram, incorporated herein by reference. The increased capacitance per unit volume of the electrolytic capacitor will allow for a reduction in the size of the ICD.

While the invention has been particularly shown and described with reference to preferred embodiments thereof, it will be understood by those skilled in the art that various changes in form and details may be made therein without departing from the spirit and the scope of the invention.

What is claimed is:

1. A method of producing an electrode for a capacitor from a foil, comprising:

(a) coating said foil surface with photoresist;
(b) applying a holographic image to said photoresist;
(c) removing a portion of said photoresist to expose a portion of said foil and create a pattern of photoresist on said foil; and
(d) etching said foil.

2. The method of claim 1, wherein said applying step further comprises:
applying a holographic image to create a motheye pattern of photoresist.

3. The method of claim 1, wherein said foil comprises aluminum foil.

4. The method of claim 3, further comprising:
polishing said foil before said coating step.

5. The method of claim 4, wherein said coating step further comprises:
coating said foil surface with an anti-reflective coating and a photoresist.

6. The method of claim 5, wherein said coating step comprises:
spin coating or blade coating said anti-reflective coating and said photoresist on said foil.

7. The method of claim 6, wherein said removing step comprises:
removing said photoresist using a mineral acid, organic solvent or ion-etch.

8. The method of claim 7, wherein said etching step further comprises:
(a) placing said foil in an electrochemical bath comprising an anode portion comprising anode electrolyte and a cathode portion;
(b) connecting said foil to a charge source in the anode portion of said bath;
(c) applying a charge to said foil;
(d) monitoring the charge on said foil; and
(e) stopping said etching step when said charge reaches a predetermined level.

9. The method of claim 8, wherein said placing step comprises:
placing said foil in an electrolyte heated to about 75–90° C. and comprising sodium chloride in the range from about 1–3% and sodium perchlorate or sodium persulfate in the range from about 2–5%.

10. The method of claim 1, further comprising the steps, after said removing step, of:
(a) applying an oxide or metallic layer onto the exposed portion of said foil;
(b) removing remaining photoresist to expose a portion of the foil and create a pattern of oxide or metallic layer; and
(c) etching said exposed foil.

11. The method of claim 10, wherein said step of applying said oxide or metallic layer comprises:
applying a layer of aluminum oxide, gold or platinum.

12. The method of claim 1, further comprising a step, after said etching step, of:
widening said foil.

13. The method of claim 1 further comprising a step, after said etching step, of:
forming said foil.

14. The method of claim 13, wherein said forming step further comprises:
(a) forming said foil in a solution comprising citric acid;
(b) heating said solution to a temperature in the range of about 80–100° C.;
(c) forming said foil at a current density in the range of about 10–20 mA/cm$^2$; and
(d) forming said foil at a voltage in the range of about 300–600 Volts.

* * * * *